(12) United States Patent
Ericson et al.

(10) Patent No.: US 12,204,501 B2
(45) Date of Patent: Jan. 21, 2025

(54) INTEGRATION OF STRUCTURAL INFORMATION INTO AN ASSET MANAGEMENT CATALOG

(71) Applicant: Dell Products L.P., Round Rock, TX (US)

(72) Inventors: George M Ericson, Shrewsbury, MA (US); Joel Christner, El Dorado Hills, CA (US)

(73) Assignee: DELL PRODUCTS, L.P., Round Rock, TX (US)

( * ) Notice: Subject to any disclaimer, the term of this patent is extended or adjusted under 35 U.S.C. 154(b) by 0 days.

(21) Appl. No.: 18/327,712

(22) Filed: Jun. 1, 2023

(65) Prior Publication Data

US 2024/0403271 A1 Dec. 5, 2024

(51) Int. Cl.
*G06F 17/30* (2006.01)
*G06F 16/21* (2019.01)

(52) U.S. Cl.
CPC .................. *G06F 16/211* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 7,860,781 B1* | 12/2010 | Bodi | ..................... | G06Q 40/00 705/38 |
| 10,216,769 B1* | 2/2019 | Chase | .................. | G06F 16/235 |
| 10,346,149 B1* | 7/2019 | Wookey | ............. | G06Q 20/3224 |
| 10,506,003 B1* | 12/2019 | Cabanero | ............ | G06F 3/04842 |
| 11,023,835 B2* | 6/2021 | Huneycutt | ............ | G06F 16/288 |
| 11,966,384 B2* | 4/2024 | Seetharaman | ...... | G06F 16/2379 |
| 2003/0009455 A1* | 1/2003 | Carlson | ..................... | G06F 8/36 |
| 2003/0046282 A1* | 3/2003 | Carlson | ..................... | G06F 8/36 |
| 2005/0228710 A1* | 10/2005 | Richards | ............ | G06Q 10/0631 705/1.1 |
| 2005/0228819 A1* | 10/2005 | Richards | ................ | G06F 16/44 707/999.102 |

(Continued)

OTHER PUBLICATIONS

Oasis | "OData Common Schema Definition Language (CSDL) JSON Representation Version 4.01." Committee Specification Draft 05, Public Review Draft 05, Sep. 26, 2019, 75 pages.

(Continued)

*Primary Examiner* — Hung D Le
(74) *Attorney, Agent, or Firm* — Amin, Turocy & Watson, LLP

(57) ABSTRACT

Integration of structural information into an asset management catalog (e.g., using a computerized tool), is enabled. For example, a system can comprise a processor and a memory that stores executable instructions that, when executed by the processor, facilitate performance of operations, comprising: based on schema data applicable to data stored in a data storage asset, determining structure data representative of a structure of the data stored in the data storage asset, in response to determining the structure data, generating a data entry, applicable to the structure data, to be added to an asset management catalog associated with the data storage asset, and in response to generating the data entry, associating the data entry with the data stored in the data storage asset.

20 Claims, 11 Drawing Sheets

(56) References Cited

U.S. PATENT DOCUMENTS

| | | | |
|---|---|---|---|
| 2005/0228829 A1* | 10/2005 | Richards | G11B 27/36 |
| 2006/0074754 A1* | 4/2006 | Toyohara | G06Q 30/0251 |
| | | | 705/14.15 |
| 2007/0022126 A1* | 1/2007 | Wulfert | G06Q 10/06 |
| 2008/0005194 A1* | 1/2008 | Smolen | G06F 16/2308 |
| 2008/0086323 A1* | 4/2008 | Petrie | G06Q 10/10 |
| | | | 705/342 |
| 2008/0133550 A1* | 6/2008 | Orangi | G06Q 10/087 |
| | | | 705/28 |
| 2008/0263103 A1* | 10/2008 | McGregor | G06F 16/285 |
| 2009/0037964 A1* | 2/2009 | Murray | G06F 16/40 |
| | | | 725/92 |
| 2009/0083343 A1* | 3/2009 | Wall | G06F 8/34 |
| 2009/0216581 A1* | 8/2009 | Carrier | G06Q 10/10 |
| | | | 705/7.25 |
| 2011/0119223 A1* | 5/2011 | Lane | G06F 16/958 |
| | | | 706/50 |
| 2011/0191320 A1* | 8/2011 | Glover | G06F 16/00 |
| | | | 707/706 |
| 2012/0095926 A1* | 4/2012 | Nishimura | G06Q 10/06 |
| | | | 705/301 |
| 2012/0096163 A1* | 4/2012 | Tai | G06F 16/27 |
| | | | 709/226 |
| 2014/0114931 A1* | 4/2014 | Cline | G06Q 30/0259 |
| | | | 707/754 |
| 2015/0055780 A1* | 2/2015 | Bajekal | H04L 9/0861 |
| | | | 380/277 |
| 2018/0165658 A1* | 6/2018 | Yokochi | G06Q 10/20 |
| 2019/0171438 A1* | 6/2019 | Franchitti | G06N 3/08 |
| 2020/0175051 A1* | 6/2020 | Carrier | G06Q 10/063 |
| 2020/0272428 A1* | 8/2020 | Katakam | G06F 8/71 |
| 2020/0293030 A1* | 9/2020 | Okoshi | G05B 19/4183 |
| 2022/0114163 A1* | 4/2022 | Seetharaman | G06F 16/2379 |
| 2022/0391380 A1* | 12/2022 | Raghavan | G06F 21/31 |

OTHER PUBLICATIONS

Ericson, et al "Integration of Semantic Information Into an Asset Management Catalog" U.S. Appl. No. 18/327,718, filed Jun. 1, 2023, 45 pages.

ECMA International | "Standard ECMA-404. The JSON data interchange syntax." Downloaded via https://www.ecma-international.org/publications-and-standards/standards/ecma-404/, 2nd edition, Dec. 2017, 16 pages.

OMG | "UML® Unified Modeling Language." OMG Document No. formal/2017-12-05, Dec. 2017, https/www.omg.org/spec/UML/, 796 pages.

* cited by examiner

404 — Vocabulary terms available to annotate Instances, Properties, and Types

```
Package Core {
    Term description: String
}
Package Measures {
    Term unit: String AppliesTo {Property}
}
Package Validation {
    Term minimum: Decimal AppliesTo {Property}
    Term maximum: Decimal AppliesTo {Property}
}
Package Provenance {
    Term updatedBy: String AppliesTo {Instance}
    Term updatedFrom: String AppliesTo {Instance}
    Term whenUpdated: Date AppliesTo {Instance}
}
Type Date {
    year: Integer
    month: Integer
    day: Integer
}
```

402 — Type Battery

```
@Core.description = "An offline power source."
Type Battery {
    manufacturer: String
    model: String
        @Measures.unit = ah
        @Validation.minimum = 0.0
        @Core.description = "Amp Hours available"
    ampHours: Decimal
        @Measures.unit = wh
        @Validation.minimum = 0.0
        @Core.description = "Watt Hours available"
    wattHours: Decimal
}
```

406 — Instance of a file of Type Battery

```
@Provenance:updatedBy = "Jonny Didit"
@Provenance:updatedFrom = "www.oldfile.com"
@Provenance:whenupdated {
    year = 2022
    month = 6
    day = 17
}
Instance F1 uri = "www.mycom.com/oldfile" {
}
```

INTEGRATION OF STRUCTURAL INFORMATION INTO AN ASSET MANAGEMENT CATALOG

REFERENCE TO RELATED APPLICATIONS

This application is related to U.S. patent application Ser. No. 18/327,718, filed Jun. 1, 2023, and entitled "INTEGRATION OF SEMANTIC INFORMATION INTO AN ASSET MANAGEMENT CATALOG."

BACKGROUND

A typical storage entity has many storage assets. Those assets are often managed and/or used by disparate groups or sub entities. The structure of data that is stored in those assets is often designed and/or governed independently from the storage assets upon which it resides. As a result, data in such storage assets are not likely to have a single structure. Moreover, such data structures evolve and change. Even similar information, held in different storage assets, are likely to have differing data structures and/or differing access mechanisms.

A typical asset management catalog provides a means to specify one or more labels on each catalog entry. Such labels typically have either a predefined format or are simple names. The meaning of each label is typically defined in the context of a specific asset management catalog. Neither form is self-defining, and both forms rely on information that is found outside of the catalog implementation.

The above-described background relating to asset management systems is merely intended to provide a contextual overview of some current issues and is not intended to be exhaustive. Other contextual information may become further apparent upon review of the following detailed description.

BRIEF DESCRIPTION OF DRAWINGS

FIG. 4 is a diagram of an exemplary schema in accordance with one or more embodiments described herein.

DETAILED DESCRIPTION

Figure 1:
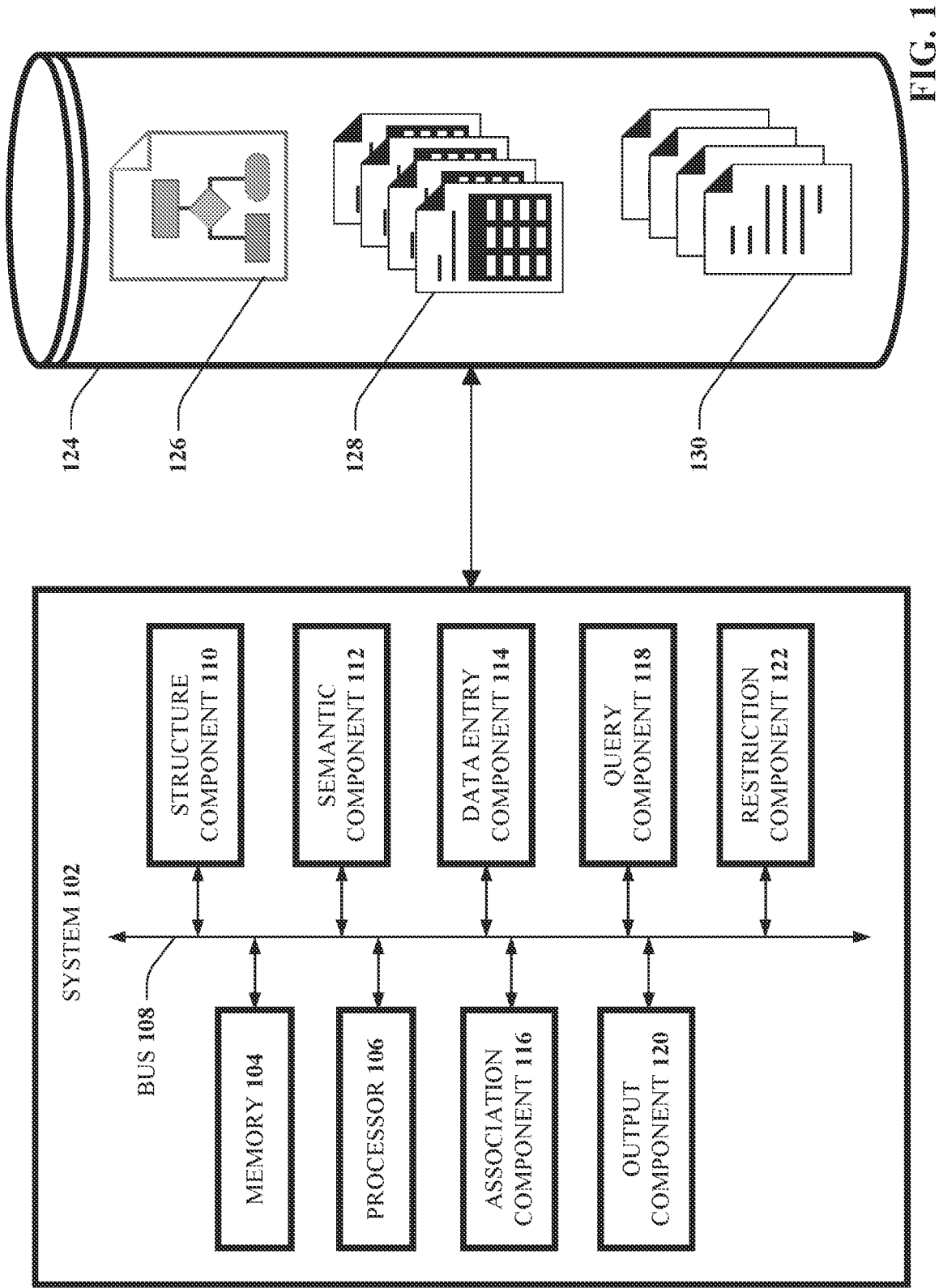
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, asset management systems can be improved in various ways, and various embodiments are described herein to this end and/or other ends. The disclosed subject matter relates to asset management systems and, more particularly, to integration of structural information into an asset management catalog.

According to an embodiment, a system can comprise a processor, and a memory that stores executable instructions that, when executed by the processor, facilitate performance of operations, comprising: based on schema data applicable to data stored in a data storage asset, determining structure data representative of a structure of the data stored in the data storage asset, in response to determining the structure data, generating a data entry, applicable to the structure data, to be added to an asset management catalog associated with the data storage asset, and in response to generating the data entry, associating the data entry with the data stored in the data storage asset.

In one or more embodiments, the data entry can be generated based on a defined structural metamodel associated with the data storage asset. In further embodiments, the schema data can be determined using the defined structural metamodel. In additional embodiments, the defined structural metamodel can comprise a unified modeling language based structural metamodel.

In some embodiments, the data entry can comprise an asset instance representative of a relation between the data storage asset and an instance entry in the asset management catalog. In further embodiments, the instance entry can comprise a value of a classifying type applicable to the schema data. In additional embodiments, the data entry can comprise a first data entry, and the above operations can further comprise generating a second data entry, applicable to the structure data, to be added to the asset management catalog, and in response to generating the second data entry, associating the second data entry with the data stored in the data storage asset, wherein the second data entry comprises feature data representative of a structural component of the instance entry, associated with the classifying type.

In one or more embodiments, the data entry can comprise a default value of a feature applicable to the data stored in the data storage asset. In other embodiments, the data entry can comprise a schema element, associated with the schema data, that defines a top level namespace for naming elements in the asset management catalog. In further embodiments, the data entry can comprise a type element that specifies a range of possible values applicable to a type of the data.

In some embodiments, the above operations can further comprise, in response to receiving a request to query the asset management catalog for the structure data, querying the asset management catalog based on the request, and generating an output representative of the structure data, applicable to the query.

In another embodiment, a non-transitory machine-readable medium can comprise executable instructions that, when executed by a processor, facilitate performance of operations, comprising: based on schema data applicable to data stored in a data storage asset, determining structure data representative of a structure of the data stored in the data storage asset, in response to determining the structure data, generating a group of data entries, applicable to the structure data, to be added to an asset management catalog associated with the data storage asset, and in response to generating the group of data entries, associating the group of data entries with the data stored in the data storage asset.

In various embodiments, a data entry of the group of data entries can be generated based on a defined structural metamodel associated with the data storage asset. In further embodiments, the schema data can be determined using the defined structural metamodel. In additional embodiments, the defined structural metamodel can comprise a unified modeling language based structural metamodel.

In some embodiments, a data entry of the group of data entries can comprise an asset instance representative of a relation between the data storage asset and an instance entry in the asset management catalog. In further embodiments, the instance entry can comprise a value of a classifying type applicable to the schema data. In additional embodiments, the data entry can comprise a first data entry, and the above operations can further comprise generating a second data entry, applicable to the structure data, to be added to the asset management catalog, and in response to generating the second data entry, associating the second data entry with the data stored in the data storage asset, wherein the second data entry comprises feature data representative of a structural component of the instance entry, associated with the classifying type.

According to yet another embodiment, a method can comprise, based on schema data applicable to data stored in a data storage asset, determining, by an asset management system comprising a processor, structure data representative of a structure of the data stored in the data storage asset, in response to determining the structure data, generating, by the asset management system, a group of data entries, applicable to the structure data, to be added to an asset management catalog associated with the data storage asset, and in response to generating the group of data entries, associating, by the asset management system, the group of data entries with the data stored in the data storage asset.

In various embodiments, the above method can further comprise, in response to receiving a request to query the asset management catalog for the structure data, querying, by the asset management system, the asset management catalog based on the request, and generating, by the asset management system, an output representative of the structure data, applicable to the query.

According to another embodiment, a system can comprise a processor, and a memory that stores executable instructions that, when executed by the processor, facilitate performance of operations, comprising: based on structure data representative of a structure of data stored in a data storage asset, determining semantic metadata applicable to the data stored in the data storage asset, in response to determining the semantic metadata, generating a data entry, applicable to the semantic metadata, to be added to an asset management catalog associated with the data storage asset, and in response to generating the data entry, associating the data entry with the data stored in the data storage asset.

In various embodiments, the semantic metadata can be determined to comprise a domain applicable to the data stored in the data storage asset.

In some embodiments, the data entry can comprise a term determined to be associated with the semantic metadata. In further embodiments, the above operations can further comprise restricting the term to a non-null set of metatypes determined to be applicable to the structure data. In some embodiments, the term can comprise a property that describes metadata applicable to the data stored in the data storage asset. In further embodiments, the data entry can further comprise a feature annotation associated with the term that indicates that the term is applied to a feature with a value. In additional embodiments, the data entry can further comprise an instance annotation associated with the term that indicates that the term is applied to an instance with a value. In further embodiments, the data entry can further comprise a type annotation associated with the term that indicates that the term is applied to a type with a value. In additional embodiments, the term can be modeled as a unified modeling language feature.

In various embodiments, the semantic metadata can be further determined based on schema data applicable to the data stored in the data storage asset. In some embodiments, the data entry can comprise an asset instance representative of a relation between the data storage asset and an instance entry in the asset management catalog.

In another embodiment, a non-transitory machine-readable medium can comprise executable instructions that, when executed by a processor, facilitate performance of operations, comprising: based on structure data representative of a structure of data stored in a data storage asset, determining semantic metadata applicable to the data stored in the data storage asset, in response to determining the semantic metadata, generating a group of data entries, applicable to the semantic metadata, to be added to an asset management catalog associated with the data storage asset, and in response to generating the group of data entries, associating the group of data entries with the data stored in the data storage asset.

In various embodiments, the semantic metadata can be determined to comprise a domain applicable to the data stored in the data storage asset. In some embodiments, a data entry of the group of data entries can comprise a term determined to be associated with the semantic metadata. In this regard, the above operations can further comprise restricting the term to a group of metatypes determined to be applicable to the structure data. In some embodiments, the term can comprise a property that describes metadata applicable to the data stored in the data storage asset. In further embodiments, the data entry can further comprise a feature annotation associated with the term that indicates that the term is applied to a feature with a value. In additional embodiments, the data entry can further comprise an instance annotation associated with the term that indicates that the term is applied to an instance with a value.

According to yet another embodiment, a method can comprise, based on structure data representative of a structure of data stored in a data storage asset, determining, by an asset management system comprising a processor, semantic metadata applicable to the data stored in the data storage asset, in response to determining the semantic metadata, generating, by the asset management system, a group of data entries, applicable to the semantic metadata, to be added to an asset management catalog associated with the data storage asset, and in response to generating the group of data entries, associating, by the asset management system, the group of data entries with the data stored in the data storage asset. In further embodiments, a data entry of the group of data entries can comprise a term determined to be associated with the semantic metadata.

It should be appreciated that additional manifestations, configurations, implementations, protocols, etc. can be utilized in connection with the following components described herein or different/additional components as would be appreciated by one skilled in the art.

Embodiments herein can define a process for adding structural information about the composition of an asset cataloged in an asset management catalog or asset management system described herein. While various embodiments herein relate to storage asset(s), embodiments herein can be utilized to describe the composition of any asset, for instance, by the utilization of extensible metadata terms and/or annotation of catalog entries with values for those metadata terms. Embodiments herein thus relate to assets and asset management systems. For example, storage assets herein can include files, volumes, objects, object stores, data streams, databases, etc. Asset management systems herein can comprise data catalogs (e.g., asset management catalogs). Embodiments herein enable identification and/or correlation of similar information across assets of an environment. To describe this information, it is beneficial for a system herein to be able to identify the structure and/or semantics of the components that make up each asset. For storage assets, this can apply to the structure of stored data. Embodiments herein can thus integrate information about the structure of the contents of an asset into an asset management system.

Various embodiments herein can leverage the Unified Modeling Language (UML), for instance, due to its model and/or set of definitions. In UML, the instance level describes model elements that are realized in the modeled system. The model level describes elements and relationships that can be realized in the modeled system. Each model level element can be realized from meta model elements. The metamodel level describes the semantics, behavior, and/or structure of the elements that are realized by the model level elements and/or corresponding relationships. Assets herein can comprise elements at the instance level. Models herein can comprise class definitions in a programming language, and instances can comprise the result of instantiations of those class definitions. The metamodel can thus describe how a class definition can be formed. It is noted that a structural metamodel herein can be utilized to provide a language-agnostic description of the structure of the components that make up an asset.

Embodiments herein utilize one or more of a variety of elements to describe the structure of the components of an asset. Such elements can comprise, for instance, one or more of DefaultValue, Instance, AssetInstance, Instance, InstanceValue, LiteralValue, Schema, StorageInstance, Type, and/or Feature.

AssetInstance can relate an existing cataloged asset to an Instance entry. Using this element avoids having to modify existing Asset entries. If there are multiple kinds of assets, this relationship can be specialized for each kind. For example, Storage assets can be related to Instances by a StorageInstance entry. Depending on the technology used by the catalog, such specialization can be utilized herein.

A DefaultValue can define a default value of an associated feature. The DefaultValue element comprises a metatype attribute that indicates the value is a Duration, EnumerationLiteral, Expression, InstanceValue, Interval, LiteralBoolean, LiteralInteger, LiteralNull, LiteralString, LiteralUnlimitedNatural, OpaqueExpression, and/or TimeExpression. In the case that the metatype is InstanceValue, DefaultValue is related to the Instance that defines that value. For all others, the value is serialized as a value according to the rules of UML.

An Instance can specify the value of its classifying type. An enumeration type typically has more than one Instance, in which each represents an EnumerationLiteral. Each such Instance in UML can comprise an EnumerationLiteral. Each Instance is named in the context of a Schema.

A Feature can specify a structural component of instances of its classifier (a containing class, association, or datatype.) Each Feature can be named in the context of its classifier and can comprise a Type that defines its possible values. For example, the number of values that a property may have can be defined by a lower and upper bound. In another example, a key feature can be indicated by an isKey property with a value of True. The values of a property become part of an Instance of the type of the property. In the scope of an asset catalog, the cataloged elements can hold the values. A Feature can represent an end of an association (e.g., a relationship). The type of each association end can be the type of the referenced element.

Each Schema element can define a top-level namespace for naming model elements. The elements that are named in a Schema can be used to create a formal description of an aspect of a model. Each Schema can define zero or more Type and Instance elements.

A Type element can specify a range of values that an instance of that Type can have (e.g., an instance is one value of a type). Each Type can comprise a name that is defined in the context of a defining Schema. In an embodiment, five UML-defined structural subtypes of Type can be utilized: Association, Class, DataType, PrimitiveType, and Enumeration. As described herein, a metatype enumerated property can be utilized to distinguish between each subtype. Alternatively, one or more embodiments can implement each subtype as distinct assets in the asset management catalog. Each subtype can be described according to the following paragraph.

An Association can comprise two or more properties that are the ends of an association. Each Association end can be represented by a Feature that is associated with the Type of the referenced object. A Class can specify the Features (e.g., properties) that collectively define the Instance's composition. Each Feature can define the range of values that an Instance of that class can. A Class can be referenced by an Association. An Instance of a Class can be identifiable. A DataType is a Type whose instances are identified only by their value. A DataType can be used to represent a value composed of its Features' values. A DataType is also known as a complex type. A PrimitiveType can define a predefined type that is common to known programming languages. In this regard, a PrimitiveType can be defined without any substructure. In various embodiments, a PrimitiveType can comprise subtypes (e.g., defined by UML). The UML-defined subtypes can comprise, for instance, Boolean, Integer, Real, String, and UnlimitedNatural. These subtypes can be distinguished by name. An Enumeration can define a discrete set of values. For instance, the Enumeration "Color" can specify a choice of "Red," "Blue," and "Purple". Each value (e.g., "Red") is known as an EnumerationLiteral. Like DataType, an Enumeration can have Properties. Using that feature, for instance, the flag Enumerations of C# and Java can be implemented. In various embodiments, an EnumerationLiteral can be represented with an Instance that has an Enumeration as its Type.

Embodiments herein can comprise an integration of structural metamodel elements as first class assets into an asset management catalog. In this regard, an asset table is typically in an asset management catalog, however, other tables are not. Thus, embodiments herein can add structural metamodel elements in such other tables, at the same level as the asset table, so that the structural metamodel elements can be available as first class citizens in the asset management catalog. In this regard, a first class citizen can comprise a top level object or native object type (e.g., one that is commonly worked with). Use of these structural metamodel elements leverages the abilities of an asset management catalog to operate across the cataloged assets to extract, find, and select information from the catalog. The capability described herein enables an asset management system to support change management, notifications, reporting, and remediation use cases related to the structure of the stored data. Embodiments herein thus enable the identification and correlation of similar data that are stored in different storage assets by consistently representing the data structure within an asset management system, such as in an asset management catalog. Embodiments herein can also be utilized to support description of the contents of many other types of assets. For example, a cabinet with several trays, each having multiple slots, and in which each slot has a type that specifies the types of elements it can hold.

Embodiments herein enable third-party discovery of knowledge regarding structural components of an asset. Embodiments herein thus comprise a process for enhancing an asset catalog with structural information that describes how components are organized inside each asset. New assets, which can be derived from a UML metamodel, can be used to represent the structural aspects of the asset. Consequently, the structural model can be independent of any underlying system of record holding that data.

Embodiments herein enable support for annotating asset entries with additional catalog elements that can collectively describe the organization of its structural components. The added structural elements enable catalog users or entities to determine the composition of assets without having to first examine each asset directly (e.g., to read the data from each storage asset). This makes the discovery of information significantly more efficient as compared to conventional methods or systems. The foregoing especially true when having to search through all cataloged assets to find similar information held in different locations, or to discover relationships between otherwise unrelated cataloged assets.

Embodiments herein enable annotation of any cataloged asset with machine-readable metadata that can be complex and semantically rich. It is noted that embodiments herein support user definition of metadata types. Metadata herein can be utilized to describe one or more of a variety of types of machine-readable information about annotated data. Annotations herein can be utilized, for instance, to describe domain-specific knowledge about structural information (e.g., descriptions, units of measure, time dependencies, validation requirements, aggregability, etc.)

Embodiments herein enable addition of new terms (or labels) into an asset management catalog. The specification of such terms can include the ability to express complex, multi-part content. It is noted that various embodiments herein enable application of annotations (or values) of terms onto the structural metadata that defines the content of assets cataloged in an asset management catalog. In one or more embodiments, annotations can be applied to the metadata that defines terms. Embodiments herein can thus utilize catalog interfaces to implement the definition terms within a catalog, together with the annotation of existing catalog entries with the term values. Thus, embodiments herein enable the addition of terms and/or annotations. Terms can define new meta properties that are used to describe or modify the behavior of metamodel elements. Annotations represent specific values of a term, as applied to a metamodel element. To define these terms and annotations, embodiments herein define additional catalog elements. The additional elements are: ApplicableTerm, FeatureAnnotation, InstanceAnnotation, LiteralValue, and TypeAnnotation. Additionally, Feature and Type elements are enhanced to add support for Term and StereoType metatypes, respectively.

Not all Terms can be applied to any metadata element. In various embodiments, ApplicableTerm enables restriction of a Term to a set of metatypes. Each entry specifies a Term and the metatype that it applies to. As a simplification, embodiments herein enable a Term that is not constrained by any entry in ApplicableTerm (e.g., that is applicable to any metatype). Feature herein is extended to support the metatype: Term. A Term can comprise a kind of a property that describes additional information (e.g., metadata) about cataloged elements. In various embodiments, a Term can be defined in the context of a StereoType. Unless restricted, a Term can be applied to any cataloged element.

Terms described herein can be utilized to provide additional information about a cataloged element (e.g., a description). In this regard, Terms can be utilized for one or more of a variety of complex purposes. For example, Terms herein can be utilized to specify that a Property comprises values that are expressed in units of a particular type of currency, or to specify links to related information, or to assert that the value of the Property is immutable. Some Terms, like 'description' can be meaningful for any type of asset. However, a Term that specifies 'Ordered' would not be appropriate for Property that is not an array. For this reason, in some embodiments, each Term can be restricted to a set of applicable assets. For example, when applied to an asset, a Term can describe who or what modified the asset, or who is responsible for managing the asset, and so on. The structural information for the asset can specify, for instance, that the asset type comprises a Property for consumption rate. A Term can thus be added that specifies maximum allowed consumption rate within a particular Type. A similar Property within a different Type may not be constrained in that way. It is noted that various embodiments described herein model Term as a sub type of Feature. A Feature can comprise a name, type, multiplicity, and can belong to a Schema. Another sub type of Feature is Property. It is noted that, in various embodiments, the Type of a Feature can be simple or complex. Complex Types can comprise Properties, which themselves can comprise Features. Complex Types can enable a Term to specify a value composed of the values of multiple properties. Terms that are defined by a Schema can form a collection of semantic metadata that can be utilized to augment cataloged elements. Various embodiments herein enable annotation of another cataloged asset with metadata defined by a Term. This annotation can be represented, for instance, by an InstanceSpecification for the Term. Annotations based on Terms, for instance, can extend the available semantic and behavioral information about the annotated element. An applied annotation can associate the value of a Term to some other asset. In various embodiments described herein, applied Terms can be represented by Annotation assets. An Annotation asset can comprise an instance of a Term (e.g., its structure is populated with values.) Each Annotation can become an attribute of the asset that the Annotation is applied to. In various embodiments, annotations can be split, for instance, into three elements that are described below: FeatureAnnotation, InstanceAnnotation, and TypeAnnotation.

Elements of FeatureAnnotation can indicate that a Term is applied to a Feature with a value. If the type of the Term is a primitive type, then its value can refer to a LiteralValue element. Otherwise, its value can be modeled as a reference to an instance. Elements of InstanceAnnotation can indicate that a Term is applied to an instance with a value. If the type of the Term is a primitive type, then its value can refer to a LiteralValue element. Otherwise, its value is modeled as a reference to an instance. Elements of LiteralValue can contain a value serialized using UML rules. The type of serialization can be, for instance, specified by its metatype. Elements of TypeAnnotation can indicate, for instance, that a Term is applied to a Type with a value. If the type of the Term is a primitive type, then its value can refer to a LiteralValue element. Otherwise, its value can be modeled as a reference to an instance. In various embodiments herein, Type can be extended to allow another metatype (e.g., StereoType). A StereoType can, for instance, extend the definition of another metatype. In various embodiments, permitted extensions can be expressed by the ApplicableTerm element. It is noted that a StereoType can comprise a kind of a class, with properties known as Terms.

Turning now to FIG. 1, there is illustrated an example, non-limiting system 102 in accordance with one or more embodiments herein. System 102 can comprise a computerized tool, which can be configured to perform various operations relating to integration of structural information into an asset management catalog and/or integration of semantic information into an asset management catalog. In various embodiments, the system 102 can comprise an asset management system. The system 102 can comprise one or more of a variety of components, such as memory 104, processor 106, bus 108, structure component 110, semantic component 112, data entry component 114, association component 116, query component 118, output component 120, and/or restriction component 122. In various embodiments, the system 102 can be communicatively coupled to, or can further comprise, one or more of a data storage asset 124. In various embodiments, the data storage asset 124 can comprise one or more of structural metamodel 126, asset management catalog 128, and/or data 130. In various embodiments, one or more of the memory 104, processor 106, bus 108, structure component 110, semantic component 112, data entry component 114, association component 116, query component 118, output component 120, restriction component 122, data storage asset 124, structural metamodel 126, asset management catalog 128, and/or data 130 can be communicatively or operably coupled (e.g., over a bus or wireless network) to one another to perform one or more functions of the system 102.

According to an embodiment, the structure component 110 can, based on schema data applicable to data 130 stored in a data storage asset 124, determine structure data representative of a structure of the data 130 stored in the data storage asset 124. In various embodiments, the data storage asset 124 can comprise one or more of a physical component, virtual component, or system used to store and/or manage data, such as a hard disk drive, a solid state drive, network attached storage, a storage area network, cloud storage, a tape drive, an optical disk, a flash drives, a redundant array of independent disks, a data center, a data server, or other suitable data storage assets. In various embodiments, the structure component 110 can utilize a structural metamodel 126 (e.g., a UML structural metamodel) to determine a language-agnostic description of the components that make up data 130 and/or the data storage asset 124. Such structure data can be defined, for instance, using one or more elements described herein, such as DefaultValue, Instance, InstanceValue, LiteralValue, Schema, StorageInstance, Type, and/or Feature. It is noted that different types of data 130 can comprise varying structure(s). For example, the structure of a .pdf file can differ from the structure of a .docx file, and so on.

According to an embodiment, the data entry component 114 can, in response to the structure data being determined by the structure component 110, generate a data entry, applicable to the structure data, to be added to an asset management catalog 128 associated with the data storage asset 124. In one or more embodiments, the data entry can comprise a Type element (e.g., as previously described herein) that specifies a range of possible values applicable to a type of the data. Additionally, or alternatively, the data entry can comprise a default value (e.g., DefaultValue as previously described herein) of a feature applicable to the data stored in the data storage asset 124. Additionally, or alternatively, the data entry can comprise a schema element, associated with the schema data, that defines a top level namespace for naming elements in the asset management catalog 128.

In various embodiments, the asset management catalog 128 can comprise a centralized system or database that can be utilized to organize, store, retrieve, and/or manage digital assets. The asset management catalog 128 can be configured to interface with various types of digital files, such as images, videos, audio files, documents, presentations, or other digital assets digital representations of assets, or other suitable data. It is noted that the embodiments described herein can be applied to any cataloged asset. A catalog (e.g., asset management catalog 128) can hold entries for one or more of a variety of kinds of assets. Each kind of cataloged asset can provide information about that kind of asset. While various embodiments herein utilize a storage asset (e.g., data storage asset 124), other suitable assets are envisaged. Each storage asset can describe, for instance, a file, object, database, table, or another kind of data store. Such assets can be described, for instance, by a common storage asset or by specialized kinds of storage assets. As an example, assets herein can represent a type of laptop system, with added information describing the laptop's components.

Additionally, or alternatively, the data entry can be generated (e.g., by the data entry component 114) based on a defined structural metamodel 126 associated with the data storage asset 124. Is it noted that, in various embodiments, the schema data can be determined (e.g., via the structure component 110 or another component of the system 102) using the defined structural metamodel 126. Further, the defined structural metamodel 126 can comprise a UML-based structural metamodel. Additionally, or alternatively, the data entry can comprise an asset instance (e.g., AssetInstance as previously described herein) representative of a relation between the data storage asset and an Instance entry in the asset management catalog 128. In this regard, the Instance entry can comprise a value of a classifying type applicable to the schema data. Further, the data entry can comprise a first data entry. In this regard, the data entry component 114 can generate a second data entry, applicable to the structure data, to be added to the asset management catalog 128, and the association component 116 can, in response to the generation (e.g., by the data entry component 114) of the second data entry, associate the second data entry with the data 130 stored in the data storage asset 124. In this regard, the second data entry can comprise feature data representative of a structural component of the Instance entry, associated with the classifying Type. Thus, in various embodiments described herein, the association component 116 can, in response to the generation (e.g., by the data entry component 114) of the data entry, associate the data entry with the data 130 stored in the data storage asset 124.

According to an embodiment, the query component 118 can, in response to receiving a request to query the asset management catalog 128 for the structure data, query the asset management catalog 128, based on the request. Such a query request can comprise, for instance, a search for specified assets, or sets of assets, based on a criterion or criteria specified in the query request. Such a query can enable a user to quickly locate and retrieve corresponding assets. In this regard, the output component 120 can generate an output representative of the structure data, applicable to the query. In various embodiments, such an output can comprise a set of search results that match the specified criteria contained in the query request. In some embodiments, the output can comprise data or the asset itself, an asset thumbnail or preview, asset metadata, asset descriptions, asset tags or keywords, sorting or filtering options applicable to the output, download or access capability, or other suitable outputs.

According to another embodiment, the semantic component 112 can, based on structure data representative of a structure of data 130 stored in a data storage asset 124, determine semantic metadata applicable to the data 130 stored in the data storage asset 124. In some embodiments, the semantic metadata can be determined (e.g., by the semantic component 112) to comprise a domain applicable to the data 130 stored in the data storage asset 124. In one or more embodiments, the semantic metadata can be further determined (e.g., by the semantic component 112) based on schema data applicable to the data 130 stored in the data storage asset 124.

According to an embodiment, the data entry component 114 can, in response to the determination (e.g., via the semantic component 112) of the semantic metadata, generate a data entry, applicable to the semantic metadata, to be added to the asset management catalog 128 associated with the data storage asset 124. In some embodiments, the data entry can comprise a term (e.g., as previously described herein) determined to be associated with the semantic metadata. In one or more embodiments, the term can comprise a property that describes metadata applicable to the data stored in the data storage asset. In various embodiments, the restriction component 122 can, in some embodiments, restrict the term to a non-null set of metatypes determined to be applicable to the structure data.

Additionally, or alternatively, the data entry can comprise a Feature (e.g., as previously described herein) annotation associated with the term that indicates that the term is applied to a feature with a value. In additional embodiments, the data entry can further comprise an instance (e.g., as previously described herein) annotation associated with the term that indicates that the term is applied to an instance with a value. In further embodiments, the data entry can further comprise a Type annotation associated with the term that indicates that the term is applied to a type with a value. It is noted that, in various embodiments, the term can be modeled as a UML feature. In various embodiments, the data entry can comprise an asset instance (e.g., AssetInstance as previously described herein) representative of a relation between the data storage asset 124 and an instance entry in the asset management catalog 128. In an embodiment, the association component 116 can, in response to the generation (e.g., via the data entry component 114) of the data entry, associate the data entry with the data stored in the data storage asset 124.

Figure 2:
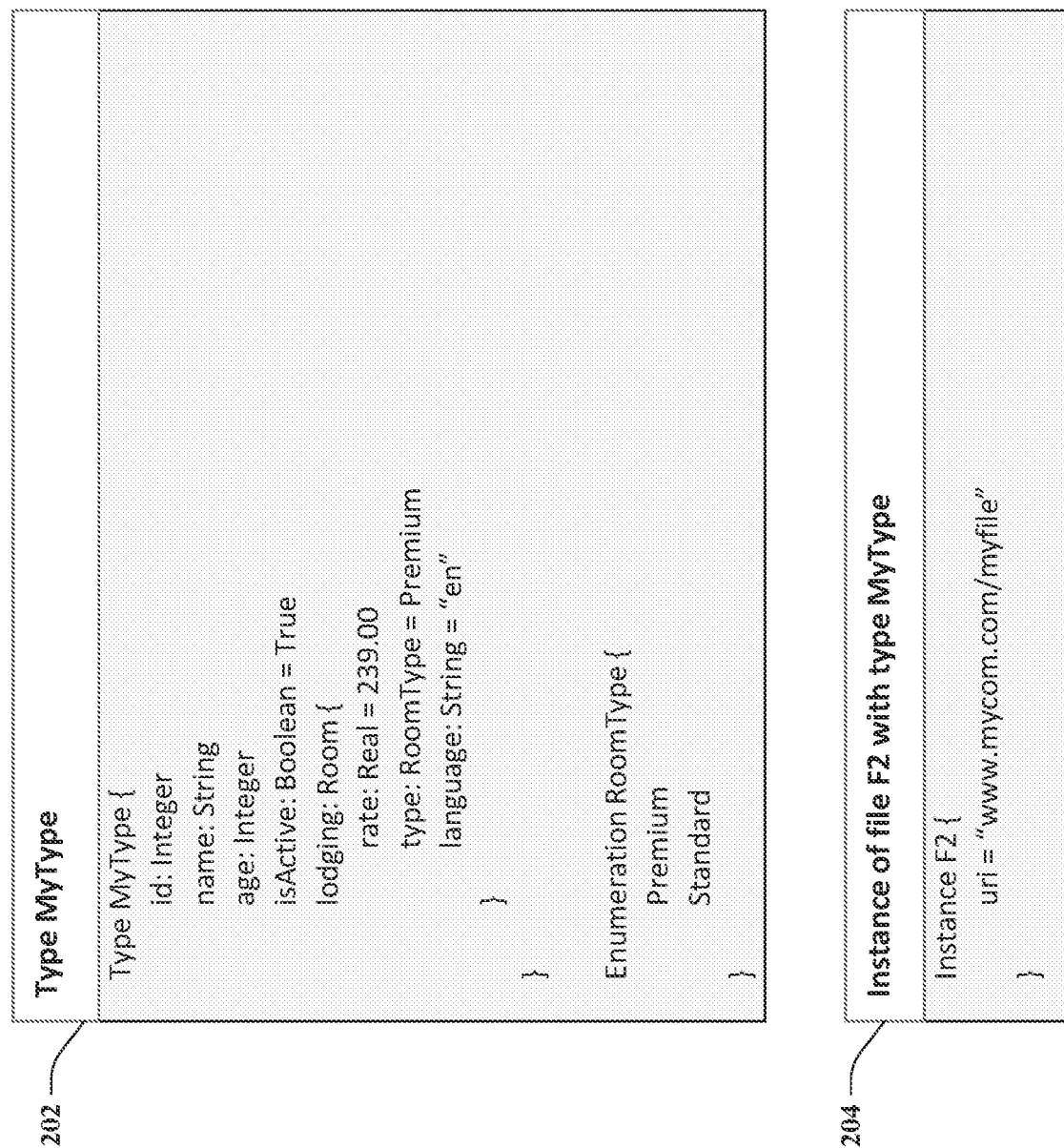
FIG. 2 is a diagram of an exemplary schema in accordance with one or more embodiments described herein.

Turning now to FIG. 2, there is illustrated a diagram 200 of an exemplary schema in accordance with one or more embodiments described herein. In diagram 200, the asset management catalog 128 is shown using tables (e.g., table 202 and table 204). It is noted that, in various embodiments, corresponding navigation properties can be similar to foreign keys in standard SQL, though other suitable embodiments are envisaged. In various embodiments, the asset management catalog 128 can originally comprise the storage table (e.g., table 202, table 204, or another suitable table). Other tables can be added to support description of the structure of data 130 stored in the data storage asset 124. In this nonlimiting example, storage is represented by an Instance. The relationship between storage and instance can be related by an indirect table called StorageInstance. This enables the asset management catalog 128 to utilize this extension for one or more other types of catalog entries. In an example, the Instance can be defined in the context of a Schema named MySchema. Another Schema can be named UMLPrimitive, which in this example, defines simple types: Real, String, Integer, and Boolean. Further, an Instance named F1 of the class MyType can represent the Storage. In various embodiments described herein, the MyType class can define the structure of the Storage asset with id F1, as shown in FIG. 2.

Figure 3:
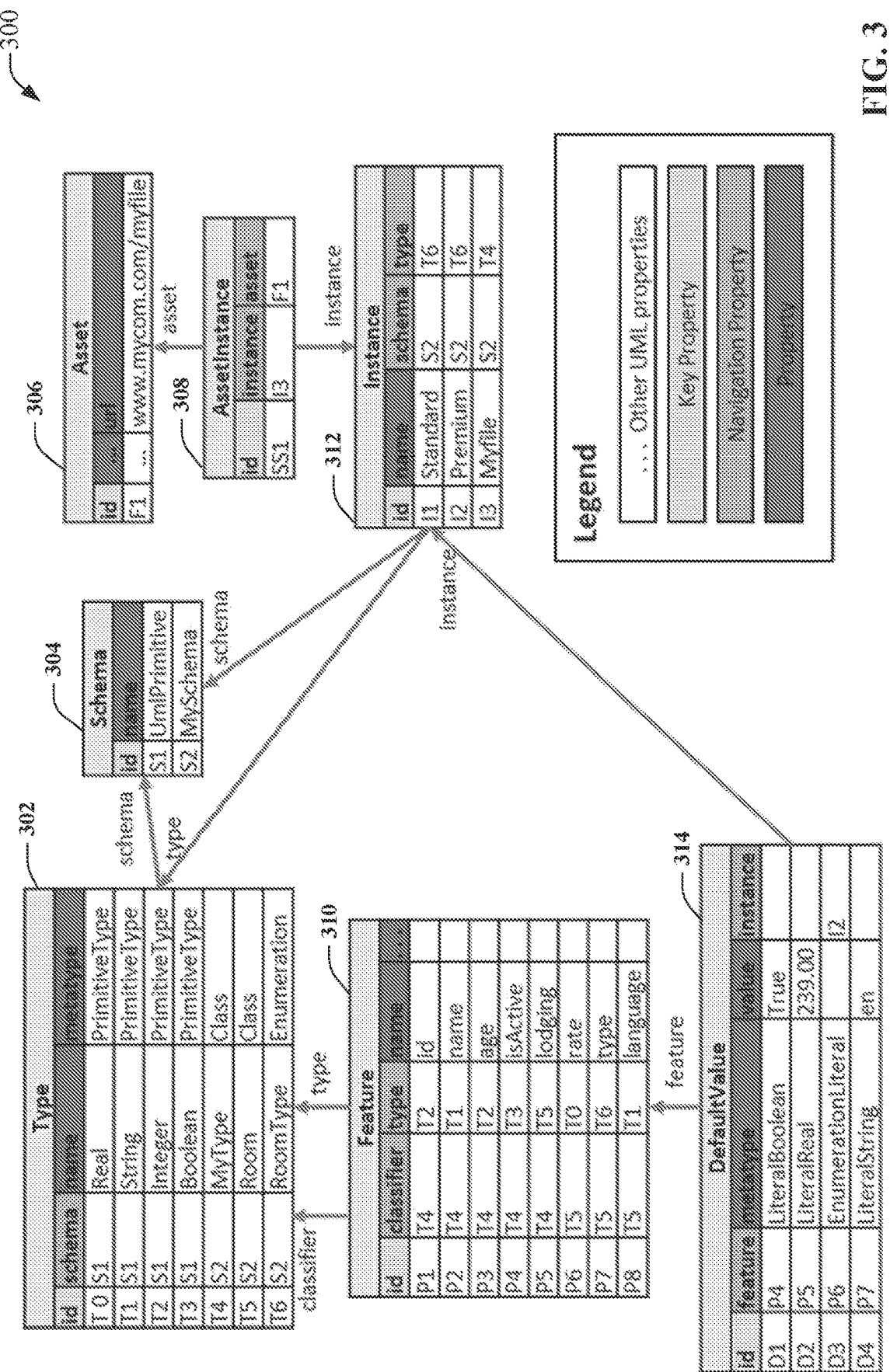
FIG. 3 is a diagram of an exemplary structural representation in accordance with one or more embodiments described herein.

FIG. 3 illustrates a diagram of an exemplary structural representation 300 in accordance with one or more embodiments described herein. In this regard, the structural representation 300 shows how an entry (e.g., a table, a file, etc.) of an asset management catalog 128 for a data storage asset 124 can be enhanced to include structural information. The structural representation 300 is different from existing implementations in which structural information is not directly accessible to query functions supported by the catalog. It is noted that the structural representation 300 shows the schema of diagram 200, but represented in a database in structural representation 300. In structural representation 300, MyType defines a structure including properties and their types: id:Integer, name:String, age:Integer, isActive:Boolean, and lodging:Room. The primitive types: Boolean, Integer, Real, and String can comprise primitive types that are defined in the UMLPrimitive Schema. It is noted that such names are purely exemplary, and any suitable set of types and/or names can be utilized. It is additionally noted that the Schema is a namespace that disambiguates Types with the same name but defined by different organizations. It is noted that, in structural representation 300, various elements described herein can be utilized to describe the structure of the components of an asset 306, such as one or more of Type 302, Schema 304, AssetInstance 308, Feature 310, Instance 312, DefaultValue 314, and/or other suitable elements.

FIG. 4 illustrates a diagram 400 of an exemplary Schema in accordance with one or more embodiments described herein. In this regard, diagram 400 shows an exemplary representation of a Schema for a battery type 402 and instance 406. In this example, each vocabulary term 404 can comprise a unique name in the context of a package. Terms can represent metadata about applicable elements. Packages are shown for Core, Measures, Validation, and Provenance. In this example, each instance of a Term is represented by the fully qualified term name prefixed by the @ character. The Type 402 definition for battery defines an Instance of a description Term for the Battery and defines additional Term instances for properties ampHours and wattHours. An Instance of a battery is shown as F1. Provenance terms are shown against battery Instance F1.

Figure 5:
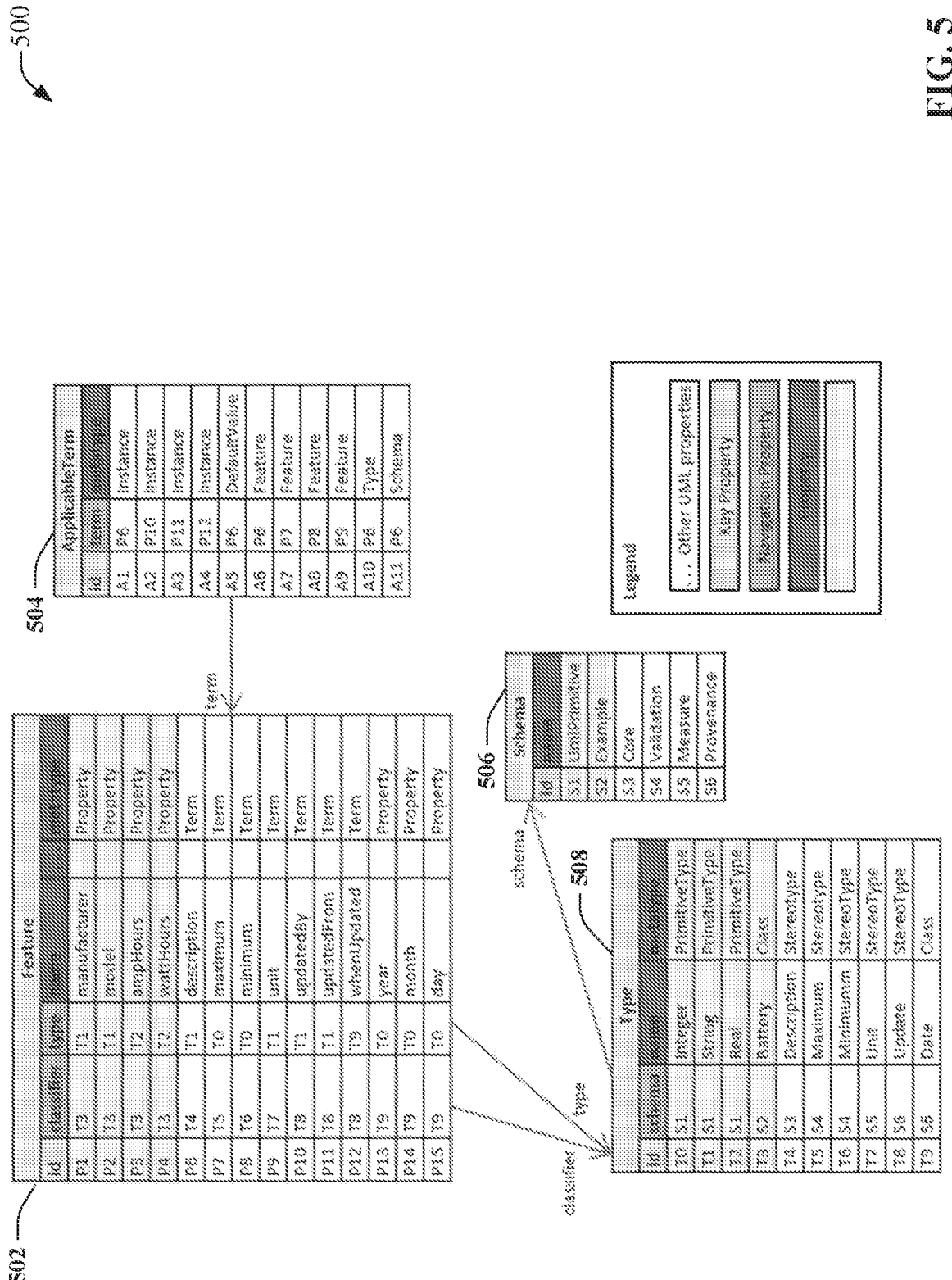
FIG. 5 is a diagram of an exemplary mapping in accordance with one or more embodiments described herein.

FIG. 5 illustrates a diagram of exemplary mapping 500 in accordance with one or more embodiments described herein. In this regard, FIG. 5 shows the mapping 500 of asset management catalog 128 elements to represent semantic vocabulary Terms (e.g., vocabulary to a database representation, such as in tables). Each vocabulary package can be represented, for instance, by a StereoType in the Type 508 table. Each Term can be represented by a row in the Feature 502 table and maps to its defining StereoType via the classifier property of the row. The Type property of the row maps to its Type definition. The ApplicableTerm 504 table has a row for each metatype that a term applies to. In mapping 500, the description term (P6) is applicable to Instance, DefaultValue, Feature, Type 508, and Schema 506.

Figure 6:
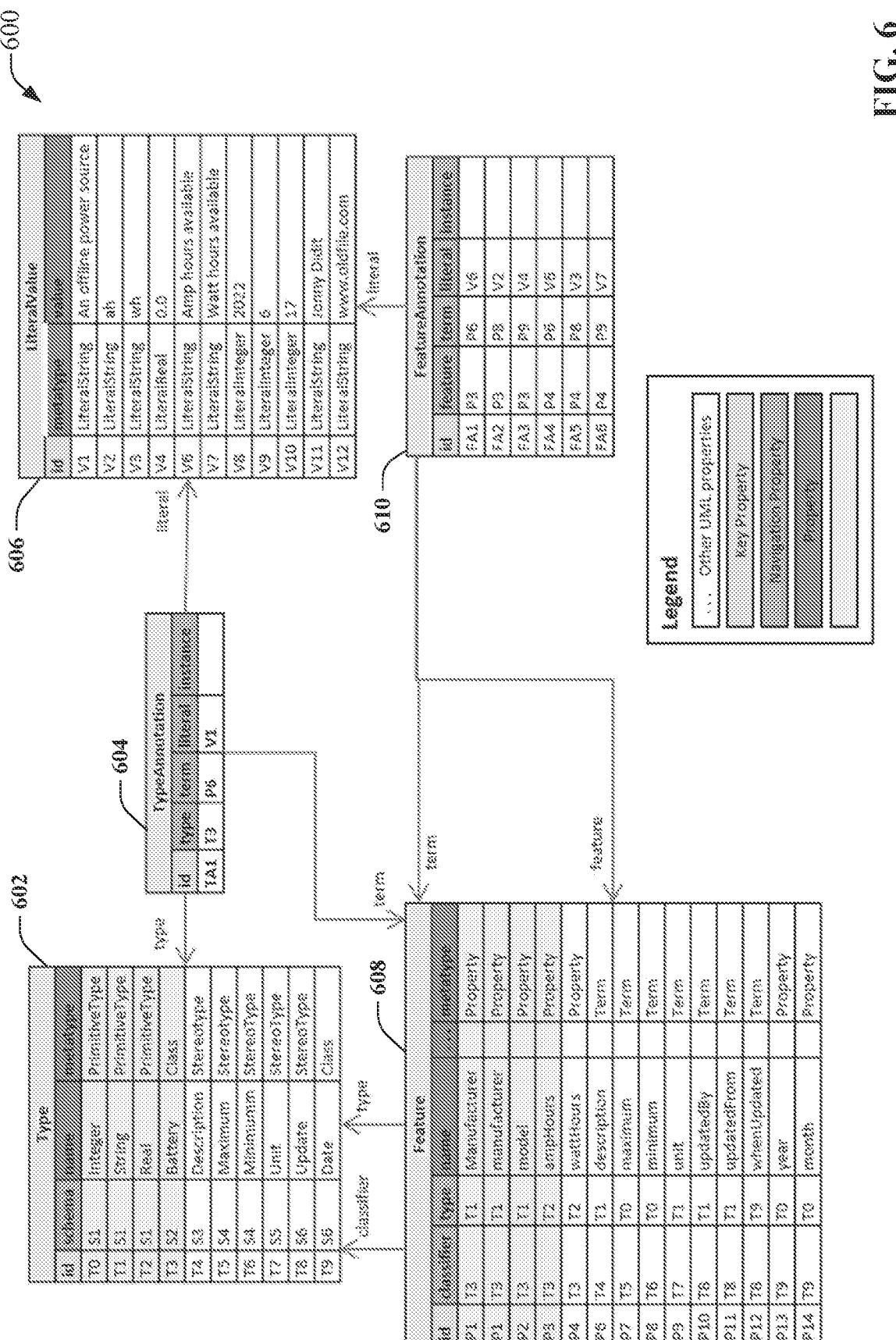
FIG. 6 is a diagram of exemplary catalog entries in accordance with one or more embodiments described herein.

FIG. 6 illustrates a diagram 600 of exemplary catalog entries in accordance with one or more embodiments described herein. In this nonlimiting example, diagram 600 shows catalog entries to define the Battery class, represented by row (T3) in the Type 602 table. Row (P6) of the Feature 608 table is the description term for the Battery. Row (TA1) of the TypeAnnotation 604 table links the battery class (T3) to the description term (T6) in the Feature 608 table, and to the value (V1) of the description in the LiteralValue 606 table. Rows (FA1) through (FA6) of the FeatureAnnotation 610 table map terms description, minimum, and unit to the ampHours and wattHours features (e.g., properties) of the battery. These rows also map each term/feature pair to the term's value in the LiteralValue 606 table.

Figure 7:
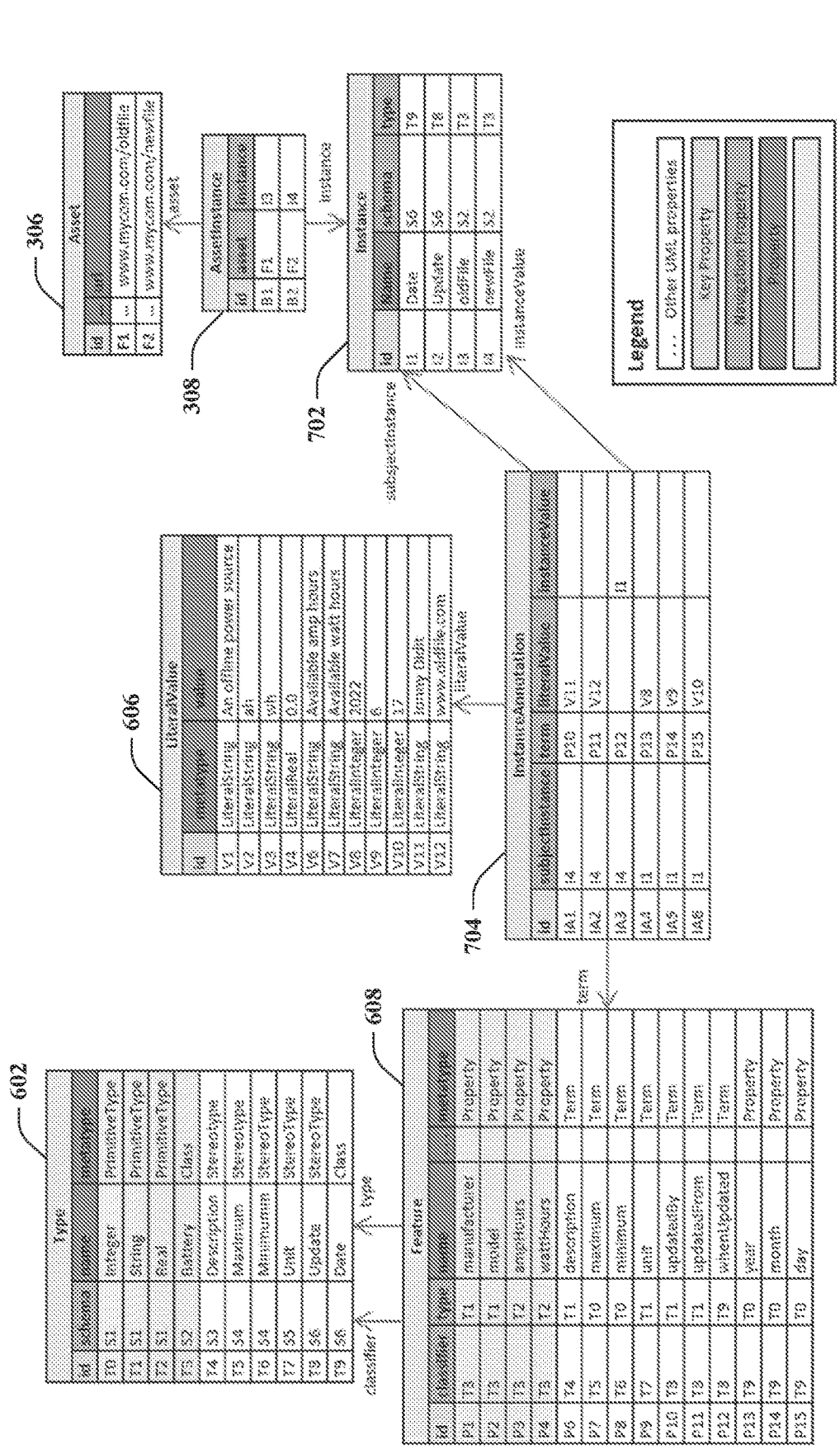
FIG. 7 is a diagram of an exemplary mapping in accordance with one or more embodiments described herein.

FIG. 7 illustrates a diagram 700 of exemplary mapping in accordance with one or more embodiments described herein. In this regard, diagram 700 shows the mapping of Term annotations on Instances. The InstanceAnnotation 704 table maps a Term from the Feature 608 table and maps annotations (e.g., instances of a term) to values for that Instance. Primitive values are represented by entries in the LiteralValue 606 table. Complex values are represented by entries in the Instance 702 table. For example, the Term whenUpdated has Type (Date), which has properties year, month, and day. An Instance of Date is represented by row (I1) of the Instance 702 table. The properties year, month, and day are represented in the InstanceAnnotation 704 table as rows IA4-IA6. These rows map to the annotation value for each Term.

Figure 8:
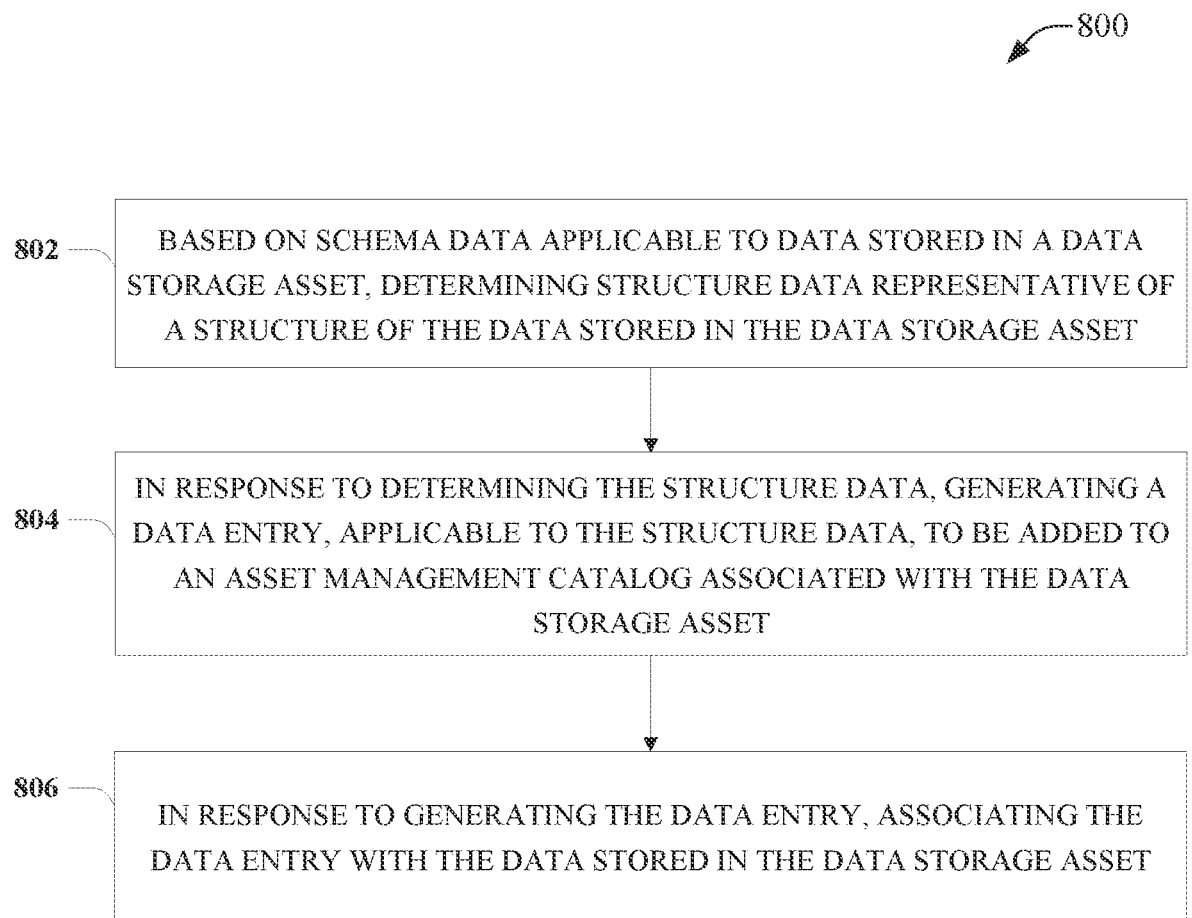
FIG. 8 is a block flow diagram for a process associated with integration of structural information into an asset management catalog in accordance with one or more embodiments described herein.

FIG. 8 illustrates a block flow diagram for a process 800 associated with integration of structural information into an asset management catalog in accordance with one or more embodiments described herein. At 802, the process 800 can comprise based on schema data applicable to data 130 stored in a data storage asset 124, determining (e.g., via the structure component 110) structure data representative of a structure of the data 130 stored in the data storage asset 124. At 804, the process 800 can comprise, in response to determining (e.g., via the structure component 110) the structure data, generating (e.g., via the data entry component 114) a data entry, applicable to the structure data, to be added to an asset management catalog 128 associated with the data storage asset 124. At 806, the process 800 can comprise, in response to generating (e.g., via the data entry component 114) the data entry, associating (e.g., via the association component 116) the data entry with the data 130 stored in the data storage asset 124.

Figure 9:
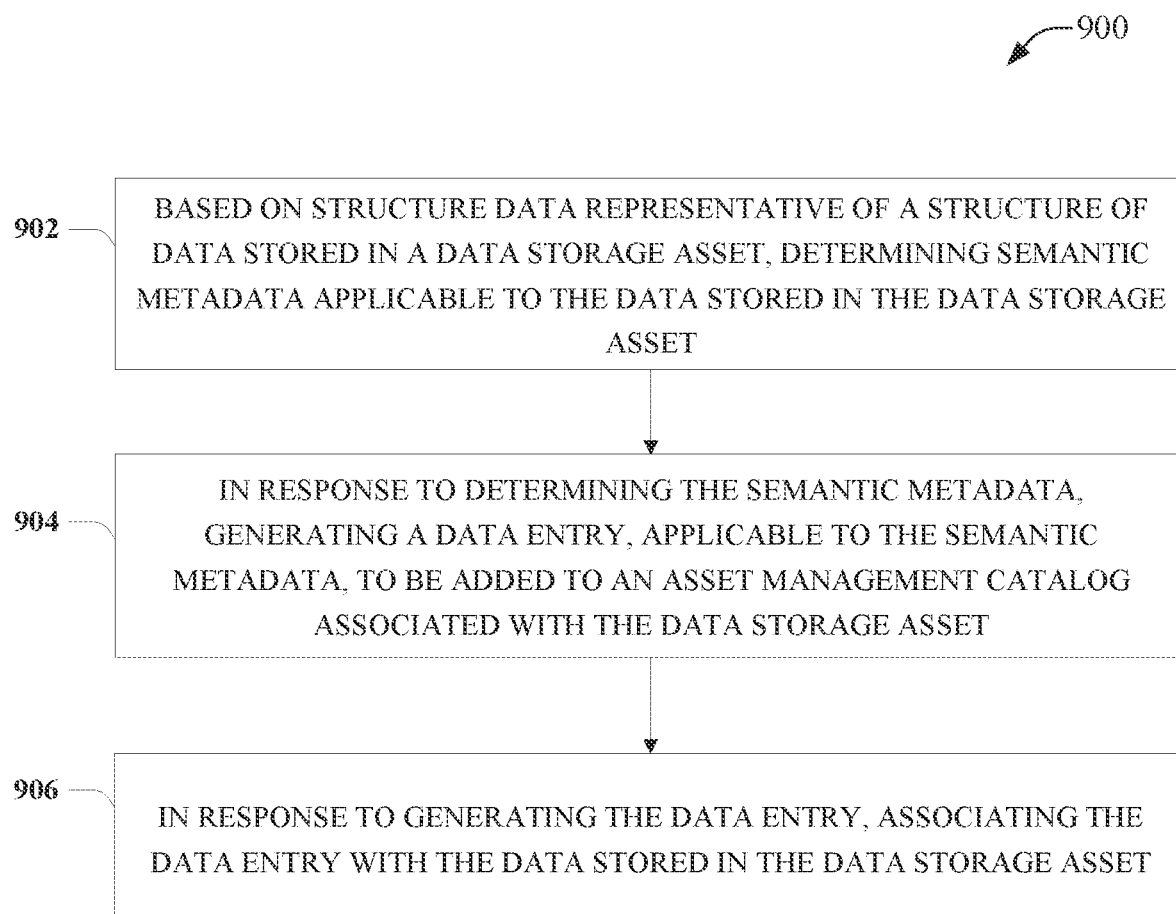
FIG. 9 is a block flow diagram for a process associated with integration of semantic information into an asset management catalog in accordance with one or more embodiments described herein.

FIG. 9 illustrates a block flow diagram for a process 900 associated with Integration of semantic information into an asset management catalog in accordance with one or more embodiments described herein. At 902, the process 900 can comprise, based on structure data representative of a structure of data 130 stored in a data storage asset 124, determining (e.g., via the semantic component 112) semantic metadata applicable to the data 130 stored in the data storage asset 124. At 904, the process 900 can comprise, in response to determining (e.g., via the semantic component 112) the semantic metadata, generating (e.g., via the data entry component 114) a data entry, applicable to the semantic metadata, to be added to an asset management catalog 128 associated with the data storage asset 124. At 906, the process 900 can comprise, in response to generating (e.g., via the data entry component 114) the data entry, associating (e.g., via the association component 116) the data entry with the data 130 stored in the data storage asset 124.

Figure 10:
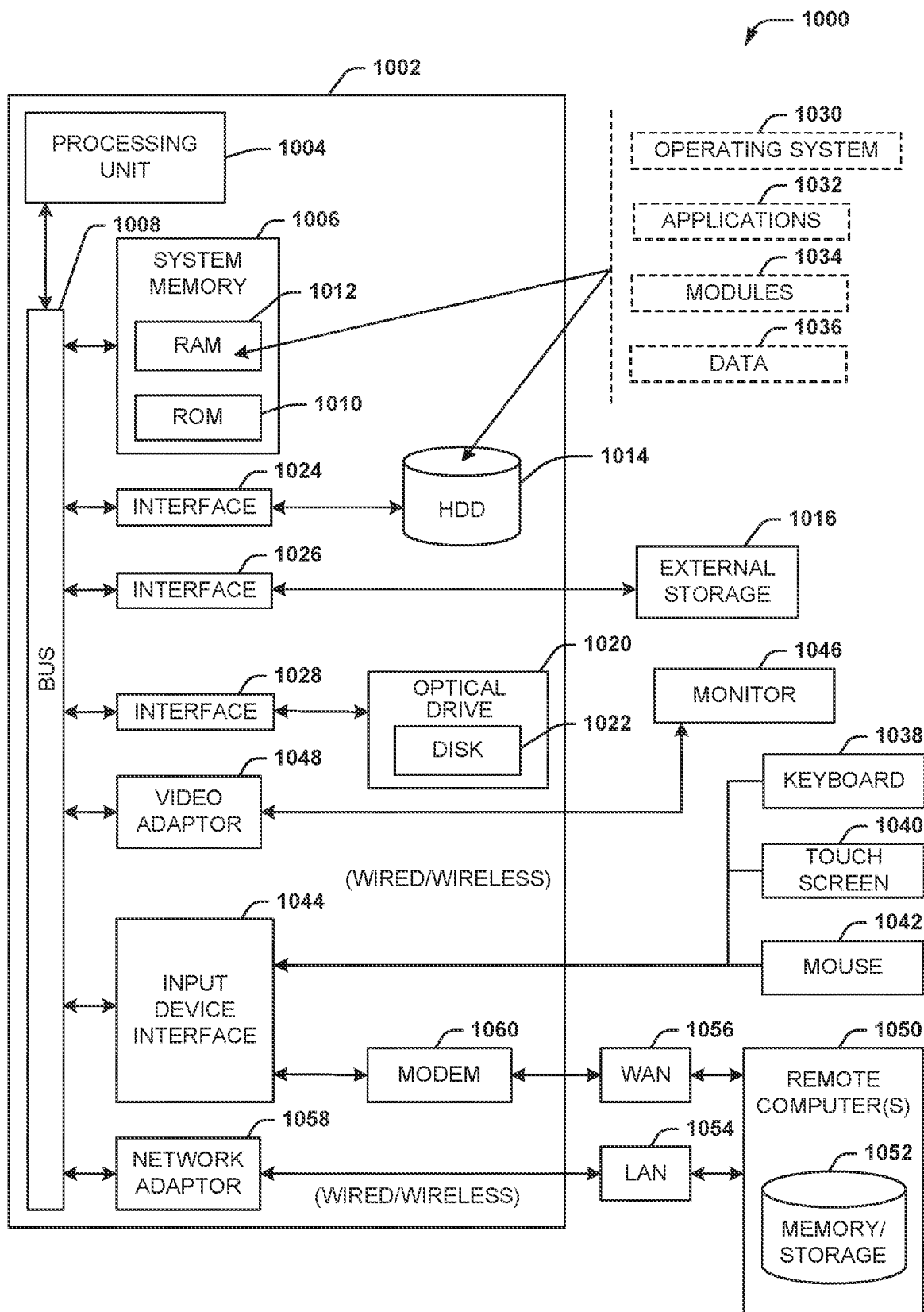
FIG. 10 is an example, non-limiting computing environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a disk 1022 such as CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
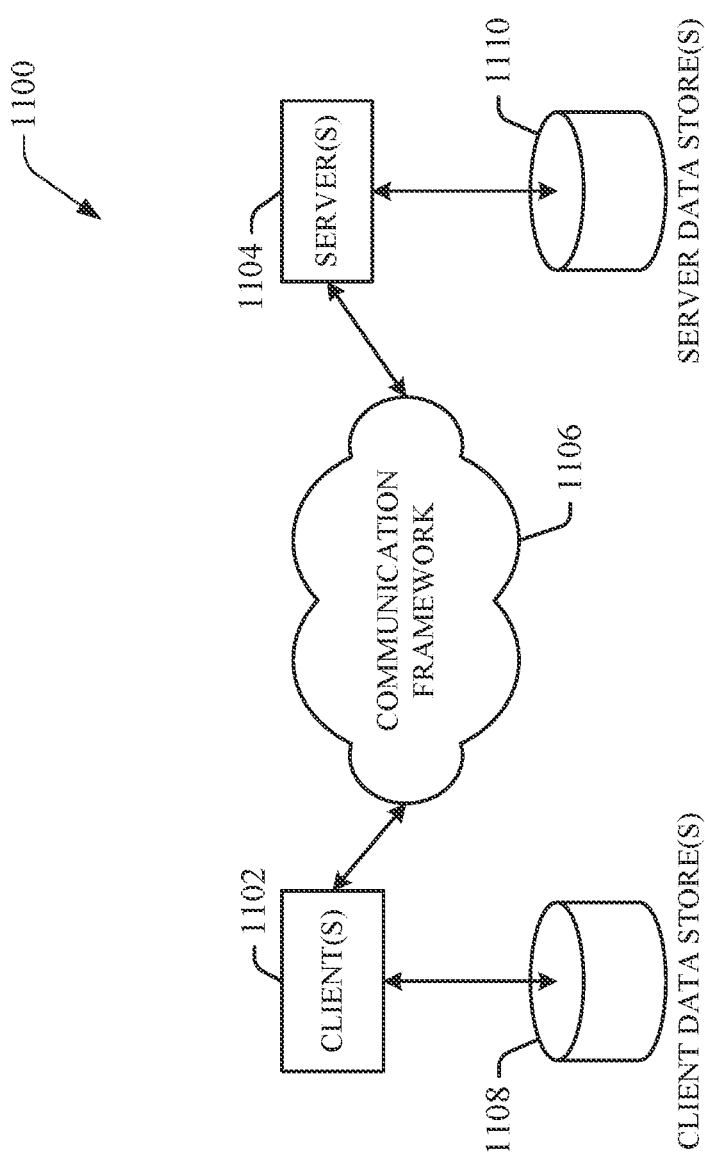
FIG. 11 is an example, non-limiting networking environment in which one or more embodiments described herein can be implemented.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations of media items by employing aspects of this disclosure, for example. One possible communication between a client 1102 and a server 1104 can be in the form of a data packet adapted to be transmitted between two or more computer processes wherein data packets may include coded analyzed headspaces and/or input. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one exemplary embodiment, a client 1102 can transfer an encoded file, (e.g., encoded media item), to server 1104. Server 1104 can store the file, decode the file, or transmit the file to another client 1102. It is noted that a client 1102 can also transfer an uncompressed file to a server 1104 and server 1104 can compress the file and/or transform the file in accordance with this disclosure. Likewise, server 1104 can encode information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   based on schema data applicable to data stored in a data storage asset and using a defined structural metamodel that provides a language-agnostic description of a structure of components of the data stored in the data storage asset, determining structure data representative of the structure of the data stored in the data storage asset;
   in response to determining the structure data, generating a data entry, applicable to the structure data, to be added to an asset management catalog associated with the data storage asset; and
   in response to generating the data entry, associating the data entry with the data stored in the data storage asset.

2. The system of claim 1, wherein the data entry is generated based on the defined structural metamodel, and wherein the defined structural metamodel is associated with the data storage asset.

3. The system of claim 2, wherein the schema data is determined using the defined structural metamodel.

4. The system of claim 3, wherein the defined structural metamodel comprises a unified modeling language based structural metamodel.

5. The system of claim 1, wherein the data entry comprises an asset instance representative of a relation between the data storage asset and an instance entry in the asset management catalog.

6. The system of claim 5, wherein the instance entry comprises a value of a classifying type applicable to the schema data.

7. The system of claim 6, wherein the data entry comprises a first data entry, and wherein the operations further comprise:
   generating a second data entry, applicable to the structure data, to be added to the asset management catalog; and
   in response to generating the second data entry, associating the second data entry with the data stored in the data storage asset, wherein the second data entry comprises feature data representative of a structural component of the instance entry, associated with the classifying type.

8. The system of claim 1, wherein the data entry comprises a default value of a feature applicable to the data stored in the data storage asset.

9. The system of claim 1, wherein the data entry comprises a schema element, associated with the schema data, that defines a top level namespace for naming elements in the asset management catalog.

10. The system of claim 1, wherein the data entry comprises a type element that specifies a range of possible values applicable to a type of the data.

11. The system of claim 1, wherein the operations further comprise:
    in response to receiving a request to query the asset management catalog for the structure data, querying the asset management catalog based on the request; and
    generating an output representative of the structure data, applicable to the query.

12. A non-transitory machine-readable medium, comprising executable instructions that, when executed by a processor, facilitate performance of operations, comprising:
    based on schema data applicable to data stored in a data storage asset and using a defined structural metamodel that provides a language-agnostic description of a structure of components of the data stored in the data storage asset, determining structure data representative of the structure of the data stored in the data storage asset;

in response to determining the structure data, generating a group of data entries, applicable to the structure data, to be added to an asset management catalog associated with the data storage asset; and in response to generating the group of data entries, associating the group of data entries with the data stored in the data storage asset.

13. The non-transitory machine-readable medium of claim 12, wherein a data entry of the group of data entries is generated based on the defined structural metamodel, and wherein the defined structural metamodel is associated with the data storage asset.

14. The non-transitory machine-readable medium of claim 13, wherein the schema data is determined using the defined structural metamodel.

15. The non-transitory machine-readable medium of claim 13 wherein the defined structural metamodel comprises a unified modeling language based structural metamodel.

16. The non-transitory machine-readable medium of claim 12, wherein a data entry of the group of data entries comprises an asset instance representative of a relation between the data storage asset and an instance entry in the asset management catalog.

17. The non-transitory machine-readable medium of claim 16, wherein the instance entry comprises a value of a classifying type applicable to the schema data.

18. The non-transitory machine-readable medium of claim 17, wherein the data entry comprises a first data entry, and wherein the operations further comprise:

generating a second data entry of the group of data entries, applicable to the structure data, to be added to the asset management catalog; and in response to generating the second data entry, associating the second data entry with the data stored in the data storage asset, wherein the second data entry comprises feature data representative of a structural component of the instance entry, associated with the classifying type.

19. A method, comprising:

based on schema data applicable to data stored in a data storage asset and using a defined structural metamodel that provides a language-agnostic description of a structure of components of the data stored in the data storage asset, determining, by an asset management system comprising a processor, structure data representative of the structure of the data stored in the data storage asset;

in response to determining the structure data, generating, by the asset management system, a group of data entries, applicable to the structure data, to be added to an asset management catalog associated with the data storage asset; and in response to generating the group of data entries, associating, by the asset management system, the group of data entries with the data stored in the data storage asset.

20. The method of claim 19, further comprising:

in response to receiving a request to query the asset management catalog for the structure data, querying, by the asset management system, the asset management catalog based on the request; and generating, by the asset management system, an output representative of the structure data, applicable to the query.

\* \* \* \* \*